United States Patent
Jeong

(10) Patent No.: US 6,826,136 B1
(45) Date of Patent: Nov. 30, 2004

(54) APPARATUS AND METHOD FOR CONTROLLING REPRODUCTION SPEED OF AN OPTICAL DISK

(75) Inventor: Hong Jo Jeong, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/538,726

(22) Filed: Mar. 30, 2000

(30) Foreign Application Priority Data

Mar. 30, 1999 (KR) .......................... 99-10925

(51) Int. Cl.[7] .............................. G11B 7/00
(52) U.S. Cl. .................. 369/47.44; 369/47.4
(58) Field of Search ............... 369/44.28, 47.48, 369/47.44, 53.37, 53.18, 53.3, 53.28, 53.14, 47.39, 47.4, 47.41, 47.43

(56) References Cited

U.S. PATENT DOCUMENTS

| 5,696,744 A | * | 12/1997 | Okamoto et al. | 369/53.22 |
| 5,724,329 A | * | 3/1998 | Kim | 369/47.4 |
| 6,097,680 A | * | 8/2000 | Yen et al. | 369/53.18 |
| 6,377,527 B1 | * | 4/2002 | Hirashima | 369/53.23 |

FOREIGN PATENT DOCUMENTS

| EP | 0 821 356 A1 | 1/1998 |
| EP | 0 833 328 A2 | 4/1998 |
| JP | 10-199131 | 7/1998 |
| JP | 10-302384 | 11/1998 |
| JP | 11-073719 | 3/1999 |
| KR | 199854951 | 12/1998 |
| KR | 199854952 | 12/1998 |
| KR | 1999176 | 1/1999 |

* cited by examiner

Primary Examiner—Tan Dinh
Assistant Examiner—Kimlien Le
(74) Attorney, Agent, or Firm—Birch, Stewart, Kolasch & Birch, LLP

(57) ABSTRACT

This invention provides method and apparatus for controlling reproduction speed of an optical disk, which detects the magnitude of a disk vibration after initial operation of an optical disk and adjusts the disk rotation speed based upon the vibration magnitude. The method according to this invention comprises the steps of rotating an installed optical disk; detecting the quantity of signal derived from tracking error signals which are combined from signals reproduced from the optical disk when the rotation speed reaches to a predetermined speed; and deciding whether to increase the rotation speed above the predetermined speed based upon the detected quantity of the signal. This invention is able to reproduce an optical disk at the possible maximum speed within allowable speed limit through detecting accurate disk vibration magnitude at the initial operation stage and adjusting the reproduction speed to higher speed.

5 Claims, 5 Drawing Sheets

FIG. 3

| Test Set \ Data \ RPM | 4000 RPM | | 5000 RPM | |
|---|---|---|---|---|
| | Normal Disk | 1.0G Disk | Normal Disk | 0.5G Disk |
| Set No.1 | 6365 | 13298 | 8705 | 13556 |
| Set No.2 | 4844 | 12933 | 6529 | 14701 |
| Set No.3 | 6399 | 17410 | 8725 | 16128 |
| Set No.4 | 4455 | 13352 | 7071 | 10080 |
| Set No.5 | 6759 | 9476 | 8721 | 12366 |
| Set No.6 | 6014 | 16117 | 7888 | 18363 |
| Set No.7 | 6403 | 12390 | 8672 | 14387 |
| Set No.8 | 5665 | 13891 | 7394 | 11856 |
| Set No.9 | 7401 | 13368 | 9328 | 12560 |
| Set No.10 | 7119 | 14825 | 9605 | 17235 |
| Reference values | 8000 | | 9500 | |

APPARATUS AND METHOD FOR CONTROLLING REPRODUCTION SPEED OF AN OPTICAL DISK

BACKGROUND OF THE INVENTION

1. Field of the Invention

This invention relates to method and apparatus for controlling reproduction speed of an optical disk, which detects the magnitude of a disk vibration after initial operation for an optical disk and adjusts the disk rotation speed based upon the vibration magnitude.

2. Description of the Related Art

As media for recording digital information, a Compact Disk (referred as "CD" hereinafter) or a Digital Versatile Disk (referred as "DVD" hereinafter) series are generally used. Such kinds of optical disks can record enormous quantity of information such as long-time moving pictures, and these recording media are continuously developed for higher speed to reproduce or record more data within shorter time.

However, this high-speed reproduction inevitably causes disk vibration because of weight or eccentricity of a disk. Such a disk vibration at high speed generates a loud noise and increase difficulties of servo controls such as a tracking control, a focussing control and a sled control, thus might cause an error in searching a recording or reproduction point. These situations, if occurred, make it impossible to record or reproduce data accurately.

Accordingly, for high-speed reproduction, a vibration magnitude should be detected first. To do this, the vibration magnitude may be detected based upon reproduced signals and then a rotation speed is decreased if the vibration magnitude exceeds a certain critical level. For these speed adjusting processes, a conventional art equips a shock sensor for detecting a magnitude of disk vibration while a disk is rotating. The shock sensor outputs electric energy proportional to a vibration magnitude. However, this method causes rise in cost due to the equipment of a shock sensor.

To reduce the cost, several apparatuses for reproducing an optical disk which can detect disk vibration magnitude based upon reproduced signals without an additional sensor during high-speed reproduction and adjust a rotation speed depending upon the detected vibration magnitude have been invented, and they have been filed with the Korean patent application No. 98-54951, 98-54952 and 99-176, respectively.

The method according to the Korea patent application No. 98-54951 detects both vibration and eccentricity of a disk using a tracking error signal and controls a spindle motor. For this process, it detects disk vibration depending upon how many times a tracking error signal exceeds a predetermined standard slice level for a given time, samples and holds the peak and bottom level of the tracking error signal, computes the difference between peak and bottom, and checks whether there is an eccentricity by comparing the difference with a standard level. After then, it does not decrease a current rotation speed in case that there is an eccentricity even though the detected disk vibration exceeds the predetermined level.

The method according to the Korea patent application No. 98-54952 (also filed in the U.S. Patent and Trademark Office) detects an unbalance magnitude of an optical disk and controls a rotation speed according to the detected magnitude. This method computes the unbalance magnitude using the difference between A and B of a photo diode in which A and B are signals converted from a reflected main beam, and adjusts a driving voltage applied to a spindle motor depending upon the computed unbalance magnitude.

The method according to the Korea patent application No. 99-176 rotates an installed optical disk at a predetermined initial reproduction speed, measures how much the optical disk vibrates based upon levels of a high-frequency signal reproduced from the rotating optical disk, and controls the reproduction speed depending upon the measured disk vibration.

The above conventional methods detect a vibration of an optical disk based upon levels detected from an optical disk as explained above. However, they are not able to guarantee an accuracy in calculating vibration magnitude since the signal level to use in detecting disk vibrating magnitude is very sensitive, therefore, the reproduction cannot be performed under the optimal maximum speed since it is difficult to detect the vibration magnitude in precision even though the vibration magnitude exceeds a certain level.

SUMMARY OF THE INVENTION

It is an object of the present invention to provide apparatus and method for controlling reproduction speed of an optical disk, capable of detecting the magnitude of disk vibration caused by a high-speed rotation, and adjusting its reproduction speed based upon the detected vibration magnitude.

It is another object of the present invention to subdivide the magnitude of disk vibration based on respective rotation speeds and to adjust the reproduction speed of an optical disk depending upon the detected vibration magnitude and a current speed range.

The reproduction speed control apparatus according to this invention comprises a driving means for rotating an inserted optical disk; a counting means for counting a prescribed signal derived from a tracking error signal of the rotating optical disk; and a controlling means for controlling a reproduction speed of the optical disk based on the counted value.

The method according to this invention comprises the steps of: rotating an installed optical disk; detecting the quantity of a prescribed signal derived from a tracking error signal which are combined from signals reproduced from the optical disk when the rotation speed reaches to a predetermined speed; and deciding whether to increase the rotation speed above the predetermined speed based upon the detected quantity of the prescribed signal.

In the present invention, the driving means drives an inserted optical disk to rotate, and the counting means counts the prescribed signal derived from the tracking error signal of the optical disk being rotated by the driving means.

After that, the controlling means calculates the magnitude of disk vibration from the value counted by the counting means, and increases the rotation speed of the optical disk if the vibration magnitude is allowable at the current speed range.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 3 showes experimental count values of pulse signals for various reproduction devices and optical disks, which are counted at respective predetermined rotation speeds;

DETAILED DESCRIPTION OF THE PREFERRED EMBODIMENT

In order that the invention may be fully understood, preferred embodiments thereof will now be described with reference to the accompanying drawings.

Figure 1:
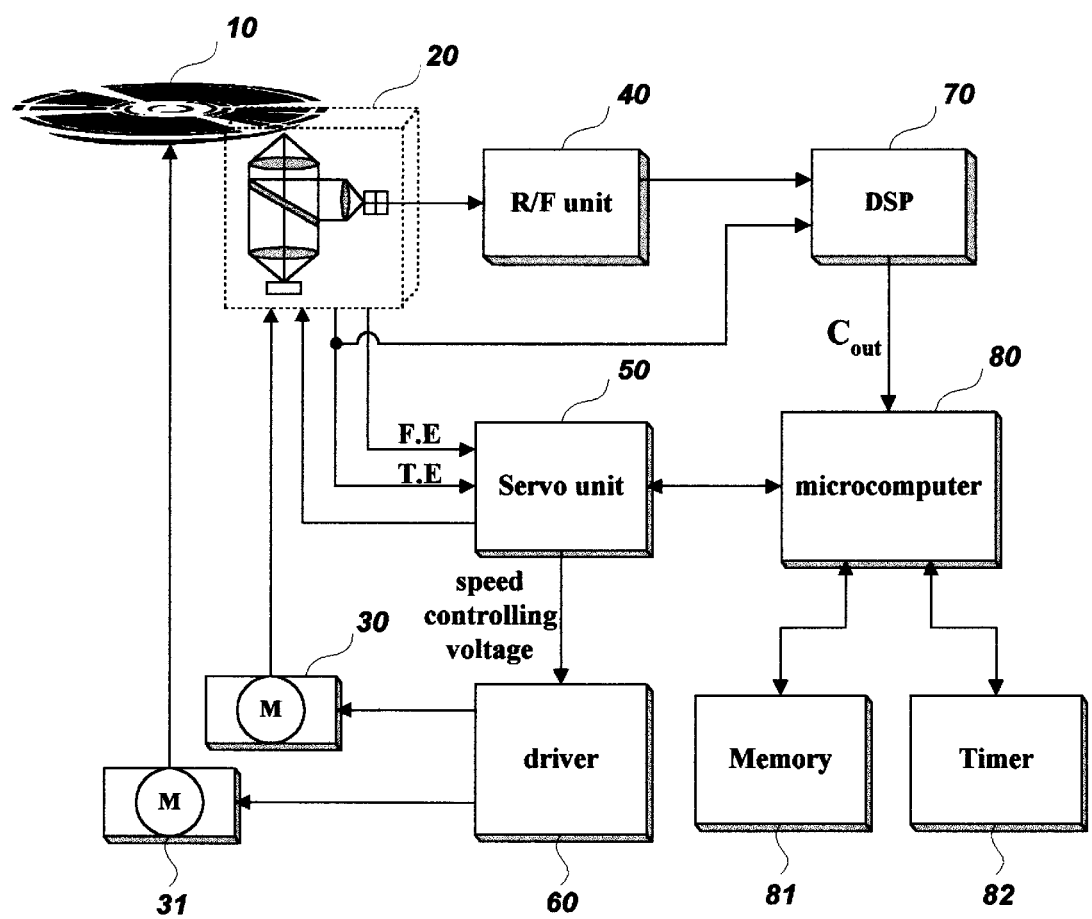
FIG. 1 is a schematic block diagram of a preferred embodiment of an apparatus for controlling reproduction speed of an optical disk according to the present invention.

FIG. 1 is a schematic block diagram of a reproduction apparatus embodying the present invention, which comprises a pickup 20 radiating a lazor beam onto an optical disk 10 and detecting recorded signals from a reflected beam; a sled motor 30 moving the pickup 20 to the radial direction of the optical disk 10; a spindle motor 31 rotating the optical disk 10; a driver 60 driving the sled motor 30 and the spindle motor 31; an R/F unit 40 for equalizing and shaping the signal detected by the pickup 20; a servo unit 50 controlling the driver 60 against the rotation speed variation of the optical disk 10 and a focussing error (F.E) signal and a tracking error (T.E) signal produced by the pickup 20 from signals detected from the optical disk 10; a digital signal processor 70 decoding signals outputted from the R/F unit 40 into original data and generating/outputting pulse signals Cout, which is derived from the tracking error signal, representing track-cross of the pickup 20; a memory 81 storing predetermined reference values of the pulse signals Cout for various rotation speeds of an optical disk; a timer 82; and a microcomputer 80 counting the pulse signals Cout outputted from the digital signal processor 70 and adjusting the rotation speed of the optical disk 10 based upon the counted value.

Figure 2:
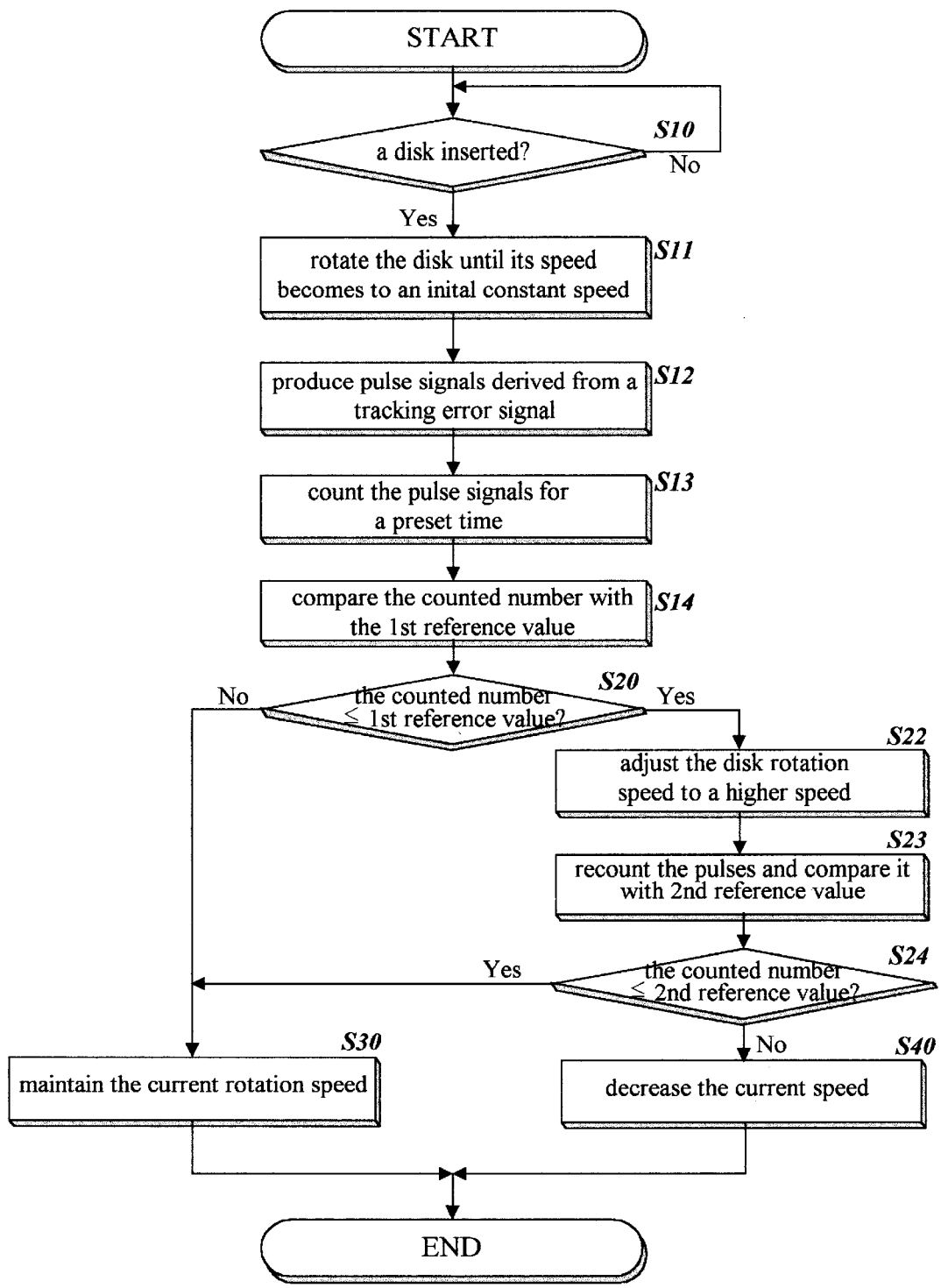
FIG. 2 is a flowchart showing a preferred method controlling disk reproduction speed according to the present invention.

FIG. 2 showes a flowchart of a preferred method controlling disk reproduction speed embodying the present invention.

The preferred embodiment of the reproduction speed control method of FIG. 2 will be described in detail together with an explanation for the operation of the reproduction apparatus of FIG. 1.

The many experimental data shown in FIG. 3 considered, the memory 81 has stored reference count values of the pulse signals, for example 8000 and 9500, etc., for each predetermined rotation speeds, for example 4000 rpm and 5000 rpm, etc. The reference count values are to be used as boudaries to decide whether the disk vibration is allowable and they are chosen from many experimental results obtained for several reproduction apparatuses as FIG. 3 showes In those experiments, a clamper (not figured) with No. 4 cavity whose diameter is larger was used to reduce variation of clamping angle, and rubber of 40 in hardness was equipped into a tray (not figured).

When the optical disk 10 is inserted and installed onto a tray (S10) of the reproducing apparatus shown in FIG. 1, the optical disk 10 is fixed by a clamper.

Figure 4:
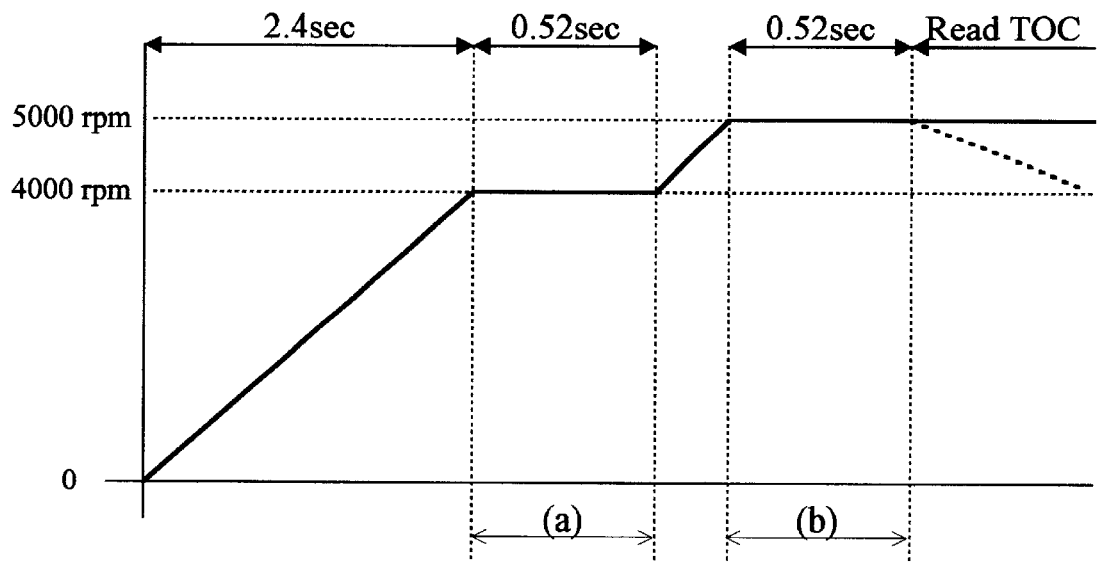
FIG. 4 is a graph showing the relation between the disk vibration magnitude detected from a tracking error signal after initial operation of an optical disk and rotating speed adjusting process.

When the inserted optical disk 10 is fixed in the tray, the microcomputer 80 drives the spindle motor 31 through the servo unit 50 and the driver 60 to rotate the optical disk 10 in order to control the reproduction speed according to speed control procedure of FIG. 4. At initial step, the microcomputer 80 forces the driver 60 to apply a driving voltage corresponding to 1st speed, i.e., 4000 rpm to the spindle motor 31.

When the rotation speed of the optical disk 10 reaches to 4000 rpm, the microcomputer 80 temporarily deactivates the tracking servo control, which makes an object lens equipped in the pickup 20 trace the center of a current track, with the focussing servo control activated. The activated focussing servo control moves the object lens up and down to maintain exact focusing distance to the disk 10.

The reason why to deactive the tracking servo control is to detect the difference of mangnitude of an actuator's shake caused by mechanical vibration by a rotating disk.

The microcomputer 80 also controls the timer 82 to count elapsing time after the tracking servo control is deactivated, and begins to accomplish the vibration detecting operation to adjust the current reproduction speed of the optical disk 10.

Figure 5:
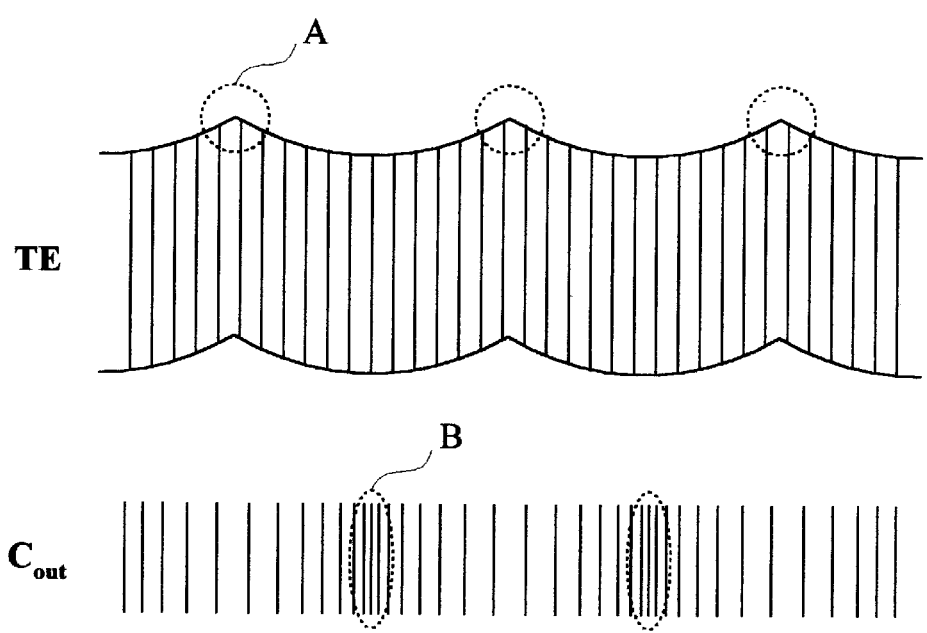
FIG. 5 shows an example of a tracking error signal and pulse signals Cout generated from the tracking error signal.

Meantime, the digital signal processor 70 produces pulse signals Cout representing track cross of a incident main beam of the pickup 20 based upon a tracking error signal (TE) outputted from the pickup 20 as shown on FIG. 5, and outputs the pulse signals to the microcomputer 80 (S12). In this process, if a object lens equipped in the pickup 20 is located around the area of the optical disk 10 where the tracking error signal is reversed in phase (A of FIG. 5), the period of the pulse signals Cout becomes longer, that is, a low frequency characteristic is revealed. On the contrary, if the object lens is located around the center of a track (B of FIG. 5), the period of the pulse signals Cout becomes shorter, that is, a high frequency characteristic is revealed.

Figure 6:
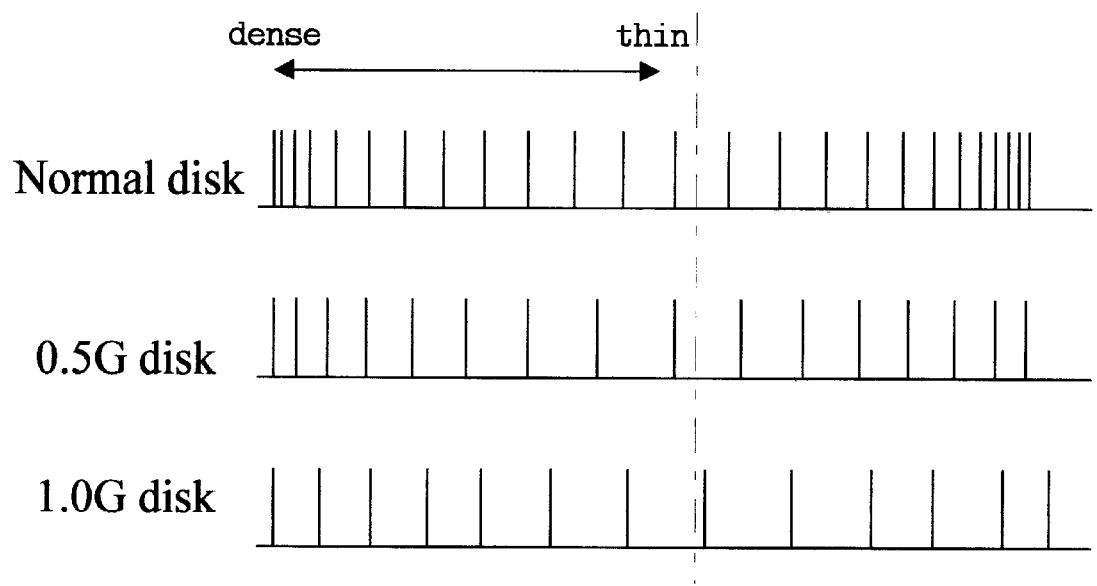
FIG. 6 showes an example of pulse signal Cout form for the disk characteristics.

The frequency characteristics are shown for 1.0 G, 0.5 G, and a normal disk in FIG. 6. FIG. 6 showes that the pulse densities are different each other. That is, a disk to cause large quantity of vibration is to generates pulses with small density which means that the number of pulses decreases.

The microcomputer 80 counts the pulse signals Cout outputted from the digital signal processor 70 (S13), and the counting operation is proceeded until the time elapsing in the timer 82 reaches to the predetermined time, for example 0.52 seconds of the interval 'a' of FIG. 4.

In the process of counting the pulse signals Cout, the microcomputer 80 checks whether the time elapsing in the timer 82 reaches to the predetermined 0.52 seconds, and if 0.52 seconds elapsed the microcomputer 80 stops the timer 82.

Then, the microcomputer 80 compares the number of pulse signals counted during the predetermined time with the 1st reference value 8000 among the reference values which are pre-stored in the memory 81 (S14), and checks how much the disk vibration is. If the number of the counted pulse signals is greater than the 1st reference value (S20), the microcomputer 80 distinguishes that the optical disk 10 is a 1.0 G (Gauss: a unit for indicating the weight variation of a disk. It indicates mass per a fixed distance, i.e., 'g/cm', from the cente hole) disk, which means that the quantity of current vibration due to rotation of the optical disk 10 exceeds an allowabe range at the current rotation speed. In the contrary, if the number of the counted pulse signals is less than the 1st reference value (S20), the microcomputer 80 tentatively distinguishes the optical disk 10 as a normal disk, which means that the quantity of the disk vibration is acceptable at the current rotation speed.

Then, the microcomputer 80 controls the rotation speed (reproduction speed) of the optical disk 10 according to the above distinguishment. If the optical disk 10 is distinguished as a 1.0 G disk since the disk vibration exceeds the allowable range, the microcomputer 80 maintains the present rotation speed 4000 rpm (S30), and if the optical disk 10 is tentatively distinguished as a normal disk since the disk vibration is allowable, the microcomputer 80 increases the driving voltage to the spindle motor 31 so that it may be rotated at the higher speed of 5000 rpm (S22).

After the optical disk 10 is distinguished as a normal disk and the rotation speed is changed to 5000 rpm, the microcomputer 80 restarts the timer 82, and counts pulse signals Cout outputted from the digital signal processor 70 during the predetermined time 0.52 sec of the interval 'b' of FIG. 4. When the predetermined time is passed in the timer 82, the microcomputer 80 compares again the number of pulse signals counted during 0.52 seconds and the 2nd reference value 9500 pre-stored in the memory 81 (S23).

After the comparison, if the number of counted pulse signals is greater than the 2nd reference value (S24), the microcomputer 80 distinguishes the optical disk 10 as a 0.5 G disk, and if not, it definitely distinguishes the optical disk 10 as a normal disk.

If the optical disk 10 is distinguished as a 0.5 G disk, the microcomputer 80 re-controls the rotation speed of the optical disk 10 to be adjusted below 5000 rpm as dotted in FIG. 4 (S40). If the optical disk 10 is definitely distinguished as a normal disk, the microcomputer 80 maintains the increased rotation speed of 5000 rpm (S30) and starts a detecting/reproducing TOC (Table of Contents) data in the lead-in area of the optical disk 10 to accomplish user data reproduction or record.

The above-explained apparatus and method for controlling a reproduction speed of an optical disk are able to reproduce and/or record an optical disk at allowable maximum speed through detecting the quantity of vibration more exactly at the initial operation stage.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for controlling a reproduction speed of an optical medium, comprising:

rotating an inserted optical medium;

counting the quantity of a prescribed signal derived from a tracking error signal reflected from the optical medium during a predetermined time in a condition of track servo OFF when the rotation speed reaches to a predetermined speed; and deciding whether to change the rotation speed based on the counted value.

2. A method according to claim 1, wherein the prescribed signal comprises pulse signals which are produced every track crossing of an optical pickup.

3. A method according to claim 1, further comprising the steps of:

increasing the rotation speed of the optical disk according to the decision of said deciding step;

recounting the quantity of the prescribed signal derived from the tracking error signal which are combined from signals reproduced from the optical disk rotating at the increased speed; and deciding whether to maintain the increased rotation speed based upon the re-detected quantity of the prescribed signal.

4. A method according to claim 1, wherein all of said steps are performed with a tracking servo control deactivated.

5. A method according to claim 1, further comprising the step of increasing the rotation speed of the optical disk according to the decision of said deciding step.

* * * * *